US012804453B2

(12) United States Patent
Pfadler et al.

(10) Patent No.: US 12,804,453 B2
(45) Date of Patent: Nov. 17, 2026

(54) METHOD FOR DETERMINING AN EFFECTIVE QUALITY OF SERVICE, QoS, IN MOBILE COMMUNICATION

(71) Applicant: Volkswagen Aktiengesellschaft, Wolfsburg (DE)

(72) Inventors: Andreas Pfadler, Berlin (DE); Luca Montero Bayo, Berlin (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 385 days.

(21) Appl. No.: 18/734,928

(22) Filed: Jun. 5, 2024

(65) Prior Publication Data

US 2024/0422616 A1 Dec. 19, 2024

(30) Foreign Application Priority Data

Jun. 13, 2023 (EP) .................................... 23179076

(51) Int. Cl.
*H04W 28/02* (2009.01)
*H04W 24/02* (2009.01)

(52) U.S. Cl.
CPC ....... *H04W 28/0268* (2013.01); *H04W 24/02* (2013.01)

(58) Field of Classification Search
CPC . H04W 28/0268; H04W 24/02; H04W 36/30; H04W 28/0967; H04W 28/24; H04W 4/40; H04L 41/145; H04L 41/147; H04L 43/50; H04L 43/08
See application file for complete search history.

(56) References Cited

U.S. PATENT DOCUMENTS

| | | | | |
|---|---|---|---|---|
| 12,137,377 | B1 * | 11/2024 | Brodeur ................ | H04W 28/24 |
| 2012/0300712 | A1 | 11/2012 | Hakola et al. | |
| 2014/0153547 | A1 * | 6/2014 | Klingenbrunn ....... | H04W 36/14 370/332 |

FOREIGN PATENT DOCUMENTS

| | | | |
|---|---|---|---|
| DE | 102020208996 | A1 | 1/2022 |
| GB | 2541237 | A | 2/2017 |

OTHER PUBLICATIONS

Priority EP Application No. 23179076.7. Extended Search Report (Oct. 27, 2023).

* cited by examiner

*Primary Examiner* — Kiet Tang
(74) *Attorney, Agent, or Firm* — Peter Zura; LOZA & LOZA, LLP

(57) ABSTRACT

Determining an effective quality of service (QoS) in mobile communication by receiving a first QoS indication from a first mobile network operator (MNO) and a second QoS indication from a second MNO, wherein the first QoS and the second QoS are defined according to different QoS models for a terminal. The first QoS and the second QoS are translated to a uniform format of the QoS. The first MNO or the second MNO is selected to provide a service that is based on the translated first QoS and the translated second QoS. By translating different QoS models to a common format and selecting the MNO based on the translated QoS values, an effective QoS can be determined and utilized for mobile communication services across multiple networks.

20 Claims, 3 Drawing Sheets

METHOD FOR DETERMINING AN EFFECTIVE QUALITY OF SERVICE, QoS, IN MOBILE COMMUNICATION

RELATED APPLICATIONS

The present application claims priority to European Patent Application No. 23179076.7 to Andreas Pfadler et al., filed Jun. 13, 2023, titled "Method For Determining An Effective Quality of Service, QoS, in Mobile Communication," the contents of which is incorporated by reference in their entirety herein.

TECHNICAL FIELD

The present disclosure relates to technologies and techniques for determining an effective quality of service, QoS, in mobile communication. The technologies and techniques may be applicable when there are a plurality of mobile network operators (MNOs) providing mobile communication service to a receiver (or otherwise to a terminal or more generically to a device).

BACKGROUND

Prior art defines an automated vehicle, also known as an AV, an autonomous vehicle, a self-driving car, a driverless car, a robo-car, or a robotic car, which may be considered a vehicle that is capable of sensing its environment and moving safely with little or no human input.

Further, automotive applications and mobile communications become more and more entangled, particularly due to the increasing interest in automatic driving that requires larger amounts of data when compared to conventional driving. These data amounts are provided partially by the vehicle itself (i.e., by sensors thereof) and partially via an air/radio interface. Via the air interface such as a vehicle to vehicle (V2V), communication or a vehicle to infrastructure (V2I), communication or a vehicle to everything (V2X), communication is carried out, the latter including communication with road side units, RSUs.

In such state-of-the-art systems, efficient mobile communication is important, which, depending on a criticality of a particular operation must also meet certain requirements concerning quality of service (QoS).

In this context, for example a 3GPP 5G radio communication system can support demanding QoS requirements of many advanced V2X use cases and their corresponding applications. However, efficient driving, especially of automated vehicles, may be affected by sudden changes of the provided QoS. For that reason, a prediction of QoS (pQoS) changes and early notification of these predicted changes to vehicles recently have been enabled for example by the 3GPP 5G communication systems. This approach enables vehicles to avoid or mitigate effects of sudden QoS changes at application level.

A predicted QoS, pQoS, may for example be used to plan execution of a route or on a lower level to plan a specific maneuver of an AV. If, for example, the pQoS does not meet the requirements long enough, an application will not perform a given action. Typically, applications adapt to a pQoS time series, so that an improved or even optimal target distance planning can be achieved to fully utilize the most out of the predicted QoS feature.

It is already foreseen that AVs will need the support of multiple MNOs. To address the topic of multi-MNO architectures, its API, and its challenges the CAMARA project has been started i.e. the "CAMARA: Telco Global API Alliance" aimed at Enabling Seamless Access to Telco Network Capabilities. CAMARA works in close collaboration with the GSMA Operator Platform Group to align API requirements and publish API definitions and APIs.

Different MNOs have distinct networks and also use distinct pQoS models and learning methods to predict the future QoS for user devices such as AVs. As a result, the pQoS profile provided to the user or user's receiver/terminal may vary between different MNOs, which as a result makes a cross MNO prediction a challenge.

A publication concerning mapping of QoS parameters corresponding to multiple RATs is provided in US 2014/0153547 A1.

SUMMARY

Aspects of the present disclosure are directed to overcoming or reducing at least some of the drawbacks of the prior art and to provide technologies and techniques for determining an effective quality of service, QoS, in mobile communication. Particularly, when there are more than one mobile network operators, MNOs, providing mobile communication service to a receiver/terminal.

Some aspects of the present disclosure are provided in the subject matters of the independent claims, found below. Other aspects are disclosed in the subject matter of the respectively associated dependent claims, the description and the figures.

In some examples, a method is disclosed for determining an effective quality of service (QoS) in mobile communication, the method comprising the steps of: receiving a first QoS indication from a first mobile network operator, MNO, receiving a second QoS indication from a second MNO, translating the first QoS and the second QoS to a uniform format of the QoS, wherein the first QoS and the second QoS are defined according to different QoS models, wherein the first QoS and the second QoS concern the same receiver/terminal. A first MNO or a second MNO is selected to provide a service depending on the translated first QoS and the translated second QoS, or the first MNO may be switched to the second MNO depending on the translated first pQoS and the translated second pQoS In some examples, a device is disclosed comprising a processor adapted to perform the steps of the methods of the present disclosure according to any variants thereof presented herein.

In some examples, a computer program comprising instructions is disclosed, which, when the program is executed by a computer, cause the computer to carry out the steps of the methods of the present disclosure according to any variants thereof presented herein.

In some examples, computer-readable storage medium is disclosed comprising instructions which, when executed by a computer, cause the computer to carry out the steps of the methods of the present disclosure according to any variants thereof presented herein.

Such computer programs are typically executed by utilizing the computing resources in a computing device e.g. a processor or a controller. Applications are stored on a non-transitory medium. An example of a non-transitory medium is a non-volatile memory, for example a flash memory while an example of a volatile memory is RAM. The computer instructions are typically executed by a processor. These memories are exemplary recording media for storing computer programs comprising computer-executable instructions performing all the steps of the computer-implemented method according the technical concept presented herein.

The different embodiments of the invention described herein may be advantageously combined unless the contrary is indicated herein.

DESCRIPTION OF THE DRAWINGS

Reference is now made to the following figures, in order to describe preferred embodiments of the invention in more detail.

DETAILED DESCRIPTION

Figure 1:
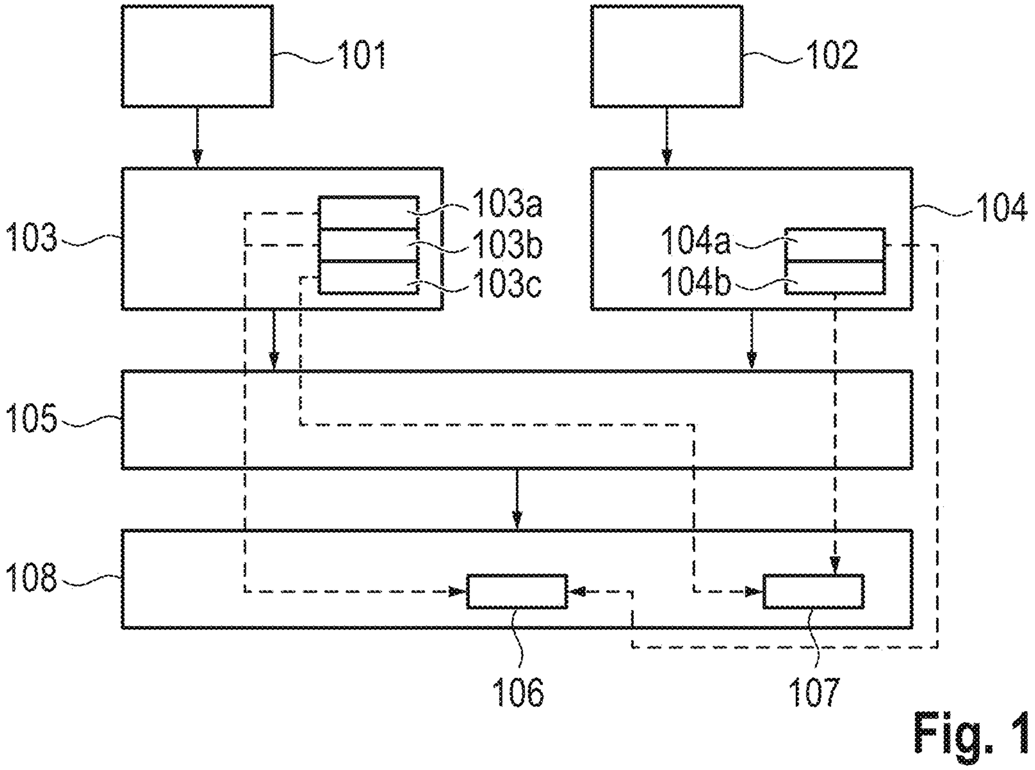
FIG. 1 illustrates a top-level example of arriving at a common pQoS, according to some aspects of the present disclosure.

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually, these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

As utilized herein, the term "example" means serving as a non-limiting example, instance, or illustration. As utilized herein, the terms "for example" and "e.g." introduce a list of one or more non-limiting examples, instances, or illustrations.

As used herein, the term "and/or" includes any and all combinations of one or more of the associated listed items. Further, the use of "may" when describing embodiments of the present invention refers to "one or more embodiments of the present invention." Further, in the following description of embodiments of the present invention, the terms of a singular form may include plural forms unless the presented context clearly indicates otherwise.

It will be understood that although the terms "first" and "second" are used to describe various elements, these elements should not be limited by these terms. These terms are only used to distinguish one element from another element. For example, a first element may be named a second element and, similarly, a second element may be named a first element, without departing from the scope of the present invention. As used herein, the term "and/or" includes any and all combinations of one or more of the associated listed items and expressions such as "at least one of" when preceding a list of elements, modify the entire list of elements.

Reference will now be made in detail to embodiments which are illustrated in the drawings. Effects and features of the exemplary embodiments will be described with reference to the accompanying drawings. Therein, like reference numerals denote like elements, and redundant descriptions are omitted. The present invention, however, may be embodied in various different forms, and should not be construed as being limited to only the illustrated embodiments herein. Rather, these embodiments are provided solely as examples for fully conveying the aspects and features of the present invention to those skilled in the art.

In some examples described herein, a QoS model may be a method for determining QoS and/or a method for reporting QoS. A QoS model may comprise QoS categories (e.g., types of data traffic flows requiring congestion management), attributes (e.g., reliability, delay, jitter, and bandwidth), and metrics (e.g., throughput, packet loss, signal-to-noise ratio). The QoS model also contains the relationships between these QoS entities and usually follows a specific structure, such as network topology and/or specific network protocols. Therefore, a given QoS model applies its specific QoS metrics and/or specific method for categorizing data traffic.

The translation aspect involves the cross-MNO pQoS API containing a function that provides an effective pQoS (uniform/common pQoS), meaning a uniform pQoS format for all MNOs, e.g., Function: effective-pQoS (pQoS_mno1, pQoS_mno2, . . . , pQoS_mnox). As a result, a first translated QoS is obtained from the first QoS, and a second translated QoS is obtained from the second QoS, both according to a uniform QoS format. Consequently, this advantageously enables a receiver/terminal and/or application to improve data management when using multiple MNOs.

Preferably, the QoS is a predictive QoS (pQoS). In such a case, pQoS is a prediction, and the corresponding pQoS model applies different approaches to arrive at predicted QoS. Such approaches may include Artificial Intelligence learning models to improve pQoS predictions. Therefore, predicting the QoS requirements of a receiver/terminal under given circumstances before executing the corresponding services can potentially improve offering the most suitable services. Naturally, pQoS is also based on input parameters, such as environmental parameters of the receiver/terminal, which may be treated differently by a pQoS model. Therefore, the variety of pQoS models is significant.

The method may be considered as a cross-MNO pQoS API, which may be implemented at different entities. For example, the cross-MNO pQoS may be implemented only at a transmitter, only at a receiver side (which may also be referred to as a user and a backend), or at an MNO's side (e.g., a base station, radio access network, core network, or the Internet global network). The examples indicated above may also be combined in a suitable system.

Having a common understanding of different pQoS indications available from different MNOs advantageously allows efficient configuration of a receiver/terminal application, often reducing operation adaptations due to mismatches between pQoS of different MNOs and/or mismatches between pQoS and actual QoS.

Preferably, according to any of the previously presented aspects, the uniform format of the QoS is terminal-dependent. For example, the cross-MNO pQoS determining module may consider the receiver/terminal type while determining the uniform pQoS. The receiver/terminal type may concern the receiver's/terminal's hardware and/or software capabilities (e.g., compliance, certifications). By having a terminal-dependent common pQoS, as translated by the pQoS managing module, it remains tailored while still providing advantages of having a cross-MNO pQoS indication.

Preferably, according to any of the previously presented aspects, the uniform format of the QoS is usage-scenario-dependent. For example, the cross-MNO pQoS determining module may consider the usage scenario while determining the uniform pQoS. The usage scenario type may concern the receiver's/terminal's movement path, time, and/or environmental considerations such as weather, speed, congestion. By having a usage-scenario-dependent common pQoS, as translated by the pQoS managing module, it remains tailored while still providing advantages of having a cross-MNO pQoS indication.

Preferably, according to any of the previously presented aspects, the translating process is learned by receiving feedback from the receiver/terminal, including an indication of a delta between the pQoS and an actual QoS for each of the first MNO and the second MNO. In a static environment, the translation process may be predefined. However, it may also adapt to current system and/or receiver/terminal (application) states. The adaptation may be based on feedback about the difference between the pQoS and the actually experienced QoS by a given receiver/terminal/application. For example, a given SNR range reported as a first QoS from a first MNO is initially translated to a throughput range 4. However, after an application provided feedback that the actual throughput experienced did not match throughput range 4, the translation module may adapt the translation mapping so that the given SNR range reported as a first QoS from the first MNO is thereafter translated to throughput range 3. Consequently, the translation process may be improved as an advantage.

Preferably, the translating process is learned by analyzing a correlation between a feature of the first pQoS and a feature of the second pQoS. The process of correlating different methods of expressing pQoS may be based on identifying a link between the received QoS metric and a translated QoS metric to learn such links for subsequent mapping/translation. For example: the first MNO provides an SNR range according to its pQoS profile, and the second MNO provides throughput according to its pQoS profile. The user's application may request a throughput-based pQoS. In such a case, the SNR can be translated to throughput after determining how different SNR ranges of the first MNO map to different throughputs. Also, even though the second MNO provides throughput as its pQoS profile, the throughput ranges provided may differ from the throughput ranges used and requested by the user's application. A link may be found between such different metrics by observing how different applications react to the executed translations. Consequently, the translation process may be improved as an advantage.

Preferably, according to any of the previously presented aspects, the translating process is learned by executing one or more test sequences using the first MNO and the second MNO and analyzing a correlation between a feature of the first pQoS and a feature of the second pQoS in view of results of the test sequences. Preferably, such test sequences involve submitting the same test requests to the same receiver/terminal/application via different MNOs. Parameters of responses from such one or more test sequences may be measured and correlated with pQoS (preferably the common pQoS). For example, after a test sequence, the pQoS managing module is aware that according to Metric 1, pQoS/QoS level 3 was achieved using MNO 1, and MNO 1 reported a pQoS Metric 2, Level 4. From that, the pQoS managing module may infer that MNO 1's pQoS Metric 2, Level 4 may be mapped to Metric 1, common pQoS/QoS level 3 (learned by observing reactions to the test sequences). When executed for all available MNOs, such test sequences advantageously allow defining a mapping correspondence, such as a mapping table, between different metrics of different MNOs to different metrics of the common pQoS.

Preferably, this correlation may be based on determining a first measured service value for the feature of the first pQoS and a second measured service value for the feature of the second pQoS, and correlating the feature of the first pQoS and the feature of the second pQoS according to a ratio between the first measured service value and the second measured service value, wherein the first measured service value and the second measured service value are of the same type.

In this example, different metrics of different MNOs' pQoS may be correlated to one another by linking them to a separate metric of a given type. For example, when the metric reported by an MNO is unknown to the pQoS managing module or not supported by the common pQoS format, it may be mapped to the metric of the common pQoS format. When two different pQoS metrics are present from two different MNOs, a ratio between these two metrics may be identified and stored in the pQoS managing module. Consequently, the different metrics of different MNOs' pQoS may be linked to each other by a ratio or a mathematical equation, such as a linear dependence equation.

Preferably, according to any of the previously presented aspects, the QoS is qualitative. One example of a qualitative QoS is 1, 2, 3, 4, 5, while another example is poor, average, good, very good. Such indications are usually meaningful in context. Such an approach to pQoS has an advantage of including consideration of high-level indications of QoS.

Preferably, according to any of the previously presented aspects, the QoS is quantitative. One example of a quantitative QoS is a specific value of a property such as latency in ms, throughput UL/DL in MB/s, or SNR. Such an approach to pQoS has an advantage of including consideration of low-level indications of QoS.

Preferably, according to any of the previously presented aspects, the translated first pQoS and the translated second pQoS are provided to the receiver/terminal. This serves the purpose of allowing receiver/terminal feedback on the received pQoS and/or informing the receiver/terminal about the pQoS. Typically, a receiver/application will request pQoS from an MNO according to an expected format, which is preferably the common pQoS format. In response, each MNO that may serve the receiver/application will provide its own pQoS, which is preferably translated to the common pQoS to advantageously allow easy comparison between pQoS of different MNOs. As a result of such comparison, the receiver/application may decide to select a serving MNO or switch a current MNO.

Preferably, according to any of the previously presented aspects, the translated first pQoS and the translated second pQoS are provided to a backend. A backend is a managing module of automated vehicles and therefore is interested in being informed about service conditions. This information provides the advantage of being useful, for example, for planning automated driving sessions by a control center.

Preferably, according to any of the previously presented aspects, the first MNO and the second MNO operate heterogeneous networks. In one example, heterogeneous networks include interconnected nodes and different types of links, which may operate according to different principles and/or protocols. As another example, Internet of Things (IoT) devices are constrained devices heterogeneous in terms of their communication protocols, device data formats, and/or technologies.

Preferably, according to any of the previously presented aspects, the QoS model depends on the QoS determination method and/or the QoS reported one or more indications. Due to differing QoS determination methods, especially for pQoS, a QoS model considers selected, different input aspects to output QoS (pQoS). The selection of inputs is implementation-dependent. Also, since QoS/pQoS models are frequently AI-based, a state of a QoS/pQoS model depends on its operation history; even if the starting models of two MNOs are the same, their current models may differ after learning processes. The QoS/pQoS reported one or more indications refer to the reported QoS/pQoS metrics, such as the qualitative and/or quantitative metrics identified above. This aspect has the advantage of differentiating QoS models depending on their internal operation as well as the types of output reports indicating QoS metrics.

In some examples, the method may further comprise a step of selecting the first MNO or the second MNO to provide a service depending on the translated first pQoS and the translated second pQoS, or switching between the first MNO or the second MNO depending on the translated first pQoS and the translated second pQoS. When an application of a user's terminal that requests information on QoS/pQoS is informed accordingly, it may adapt its operation or maintain current operation based on easily comparable QoS/pQoS information, which advantageously improves operation of applications that consider QoS/pQoS. Since MNO selection/switching is based on a more informed process, this may lead to reductions in application adaptations, which are overall beneficial for perceived quality of experience by end-users.

Turning to FIG. 1, the drawing illustrates a top-level example of arriving at a common pQoS. Although the example refers specifically to pQoS, it is also applicable to generic QoS.

In this example, a first pQoS model 101 and a second pQoS model provide input to the cross-MNO API 105 (a pQoS translation module in general). It is understood that there may be more than two pQoS models present that provide corresponding inputs.

The cross-MNO API 105 receives input 103, 104 from each of the pQoS models 101, 102. The input 103 of the first pQoS model 101 comprises three metric parameters of the first pQoS: Metric 1, Metric 2, and Metric 3 (103*a* to 103*c*). Additionally, the input 104 of the second pQoS model 102 comprises two metric parameters of the second pQoS: Metric 4 and Metric 5 (104*a*, 104*b*).

After analyzing the received inputs 103, 104 from each of the pQoS models 101, 102, the cross-MNO API 105 may determine that a combination of Metric 1 and Metric 2 of the pQoS input 103 can be mapped to Metric 6 of the pQoS common format. Based on a predetermined translation scheme 105, the values of Metric 1 and Metric 2 may be mapped to a value of Metric 6 106 for the first pQoS input 103. In this case, the value of Metric 2 may help map the value of Metric 1 to Metric 4. Correspondingly, the value of Metric 4 may be mapped to a value of Metric 6 for the second pQoS input 104.

Similarly, the cross-MNO API 105 may determine that the value of Metric 3 can be mapped to a value of Metric 7 107 for the first pQoS input 103. Correspondingly, the value of Metric 5 may be mapped to a value of Metric 7 for the second pQoS input 104.

A pQoS common report 108 comprises Metrics 6 and 7 separately for both the pQoS output 1 and pQoS output 2 of the respective MNOs.

Depending on system settings, the cross-MNO API 105 may be applicable on a case-by-case basis, i.e., locally mapping the input pQoS values into a common pQoS format (this may also be considered as per application common pQoS). However, the cross-MNO API 105 may be applicable on a global scale, i.e., always providing the same common format of pQoS for all cases of a given communication system.

In other scenarios, the uniform (common) format of the pQoS is receiver-dependent, or the uniform format of the pQoS is usage-scenario-dependent.

Figure 2:
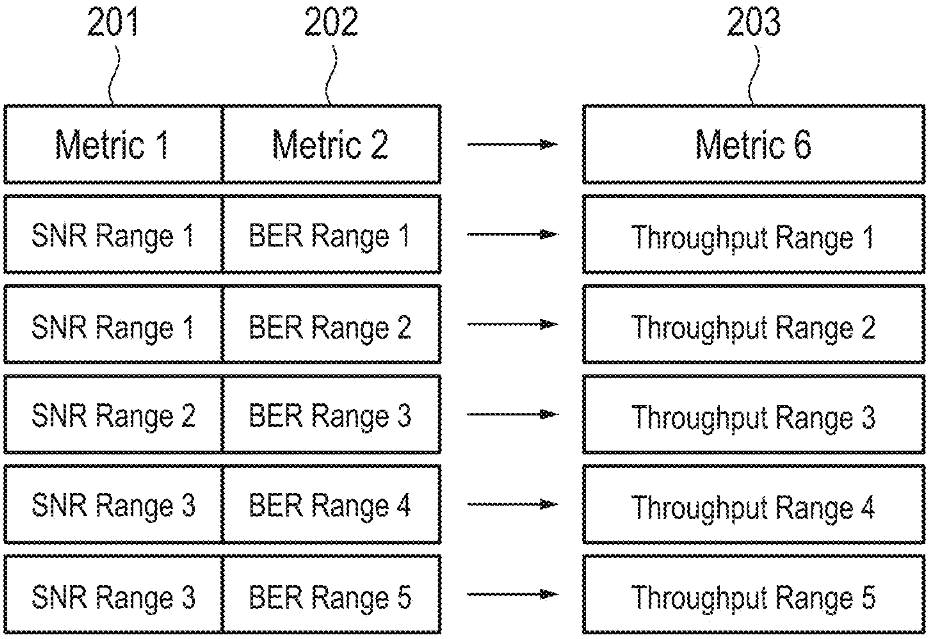
FIG. 2 illustrates an example of mapping from two input metrics to an output metric, according to some aspects of the present disclosure.

FIG. 2 illustrates an example of mapping from two input metrics to an output metric. Metric 1 and Metric 2 are exemplary and refer to SNR and BER, respectively. For example, a given range of Metric 1, i.e., SNR Range 1, may, in view of a given range of Metric 2, i.e., BER Range 1, be translated to Throughput Range 1.

Figure 3:
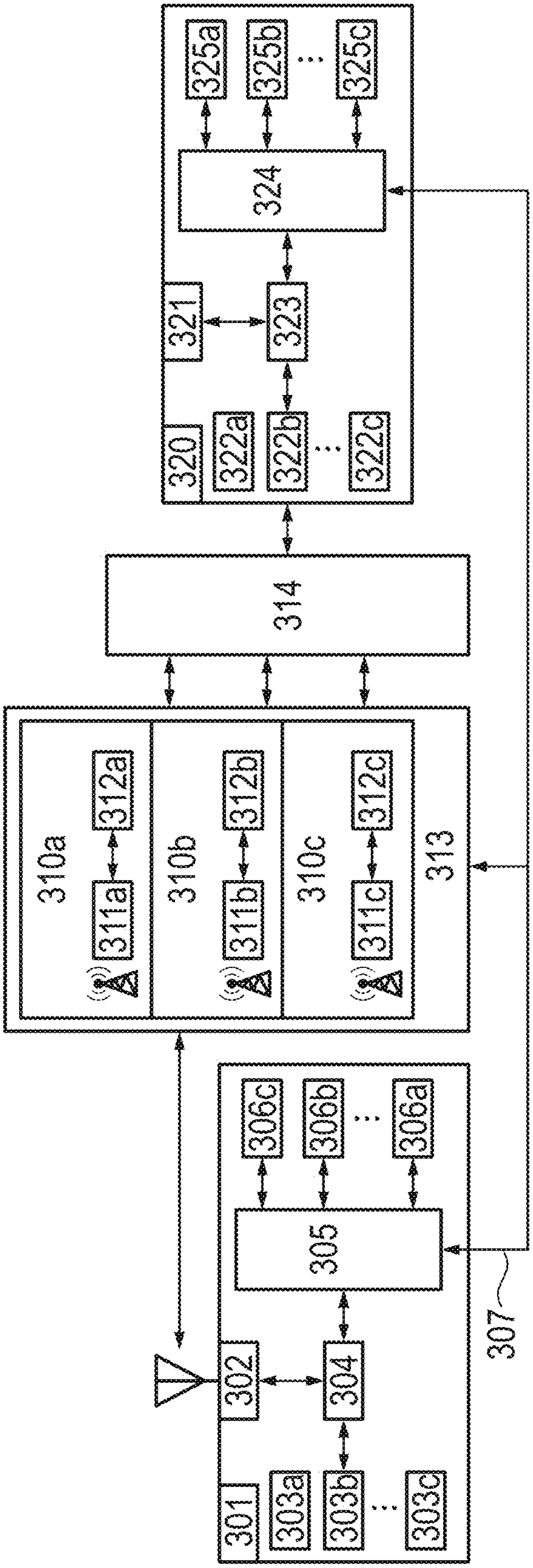
FIG. 3 illustrates an exemplary diagram of a system, according to some aspects of the present disclosure.

FIG. 3 illustrates an exemplary block diagram of a communication system according to the present disclosure.

There are three main components of the system that are a user, which is a user's terminal/receiver 301, one or more servers/systems of different MNOs 310*a* to 310*c*, a backend 320.

The user's terminal 301 executes one or more applications 303*a* to 303*c*, such as a tele-operated driving application, under the supervision of a dataflow management unit 304. The dataflow management unit 304 coordinates any data transfer for the applications 303*a* to 303*c* with a communication unit 302 of the user's terminal. A pQoS managing module 305, particularly a cross-MNO pQoS API, may also be optionally present in the user's terminal 301. This module 305 translates QoS indications of different MNOs to a common pQoS format as described previously. Typically, the pQoS managing module 305 receives input from QoS determining clients 306*a* to 306*c* of each MNO. The modules 306*a* to 306*c* may also be optionally present in the user's terminal.

The user's terminal 301 may also be configured to provide feedback 307 on QoS to other devices 310, 320, particularly when the user's terminal is not responsible for determining the cross-MNO QoS/pQoS. Such feedback 307 may indicate an actual QoS in relation to a pQoS or may directly indicate a delta between an actual QoS and a pQoS.

The system also comprises one or more servers/systems of different MNOs 310*a* to 310*c*. User terminals 301 exchange data with the one or more servers/systems of different MNOs 310*a* to 310*c*. Typically, each MNO operates a radio communication network 311*a* to 311*c* and a core network 312*a* to 312*c*. In some instances, an MNO may communicate 314 over a public or private network with a backend 320 responsible for managing user devices 301 using the available MNOs at given time instances. The backend 320 may be an automated driving control center.

Each MNO may also comprise the cross-MNO pQoS module/API 313. The cross-MNO pQoS module/API 313 may be implemented at an MNO's side, which can be understood as an implementation by one or more of the following: a base station, a radio access network, a core network, or the Internet global network. The examples indicated above may also be combined in a system.

Specifically, the core network may also comprise different devices, which may comprise the cross-MNO pQoS module/API. Such devices/functions of the core network may be one or more of: a Mobility Management Entity (MME), a Serving Gateway (SGW), a Packet Data Network Gateway (PDN GW), an Access and Mobility Management Function (AMF), a Session Management Function (SMF), a Policy Control Function (PCF), a Network Exposure Function (NEF), or similar.

Similarly, as with a user's terminal 301, the MNO 310*a* may also be configured to provide feedback 307 on QoS to other devices 301, 320, particularly when the MNO 310*a* is not responsible for determining the cross-MNO QoS/pQoS. Such feedback 307 may indicate an actual QoS in relation to a pQoS or may directly indicate a delta between an actual QoS and a pQoS.

The system also comprises the backend 320. Typically, the backend 320 comprises counterparts of the components present in a user's terminal 301. The backend 320 executes one or more applications 322*a* to 322*c*, such as a tele-operated driving application, under the supervision of a dataflow management unit 323. The dataflow management unit 323 coordinates data transfers for the applications 322*a* to 322*c* with a communication unit 321 of the backend 320.

A pQoS managing module 324, particularly a cross-MNO pQoS API, may also be optionally present in the backend 320. This module 324 translates QoS indications of different MNOs to a common pQoS format as described previously. Typically, the pQoS managing module 324 receives input from QoS determining clients 325*a* to 325*c* of each MNO. The modules 325*a* to 325*c* may also be optionally present in the backend.

Similarly, as with a user's terminal 301, the backend 320 may also be configured to provide feedback 325 on QoS to other devices 301, 310*a-c*, particularly when the backend 320 is not responsible for determining the cross-MNO QoS/pQoS. Such feedback 325 may indicate an actual QoS in relation to a pQoS or may directly indicate a delta between an actually experienced QoS and a pQoS.

Figure 4:
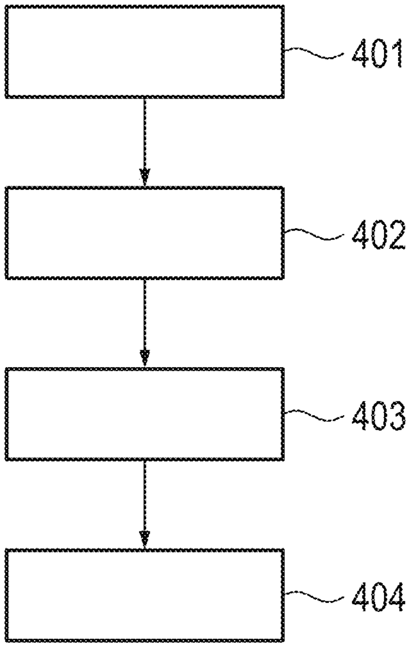
FIG. 4 illustrates a block diagram of the method, according to some aspects of the present disclosure.

FIG. 4 illustrates a block diagram of the method according to the present disclosure. In step 401, a pQoS managing module receives a first QoS indication from a first mobile network operator (MNO), and at step 402, the pQoS managing module receives a second QoS indication from a second MNO. The first QoS and the second QoS are defined according to different QoS models, and the first QoS and the second QoS concern the same receiver/terminal.

Subsequently, at step 403, the pQoS managing module executes an action of translating the first QoS and the second QoS to a uniform format of the output QoS. For example, the output is a translated first QoS and a translated second QoS, both according to the uniform format of the output QoS.

Optionally, at step 404, the translated first QoS and the translated second QoS are provided to the receiver/terminal and/or to a backend.

LISTING OF REFERENCES

101 pQoS Model 1
102 pQoS Model 1
103 pQoS output 1
103*a* pQoS output 1/Metric 1
103*b* pQoS output 1/Metric 2
103*b* pQoS output 1/Metric 3
104 pQoS output 2
104*a* pQoS output 2/Metric 4
104*b* pQoS output 2/Metric 5
105 translation/mapping of pQoSs
106 pQoS common report/Metric 6
107 pQoS common report/Metric 7
108 pQoS common report
301 user's terminal
302 Communication circuit/unit
303*a* Application 1
303*b* Application 2
303*c* Application X
304 Dataflow management unit
305 pQoS managing module (cross-MNO pQoS API)
306*a* pQoS client MNO 1
306*b* pQoS client MNO 2
306*c* pQoS client MNO X
307 feedback
310*a* mobile network operator, MNO 1
310*b* mobile network operator, MNO 2
310*c* mobile network operator, MNO X
311*a* Radio Access Network, MNO 1
311*b* Radio Access Network, MNO 2
311*c* Radio Access Network, MNO X
312*a* Core network MNO 1
312*b* Core network MNO 2
312*c* Core network MNO X
313 pQoS managing module (cross-MNO pQoS API)
314 Public/private network
320 Backend
321 Communication circuit
322*a* Application 1
322*b* Application 2
322*c* Application X
323 Dataflow management unit
324 pQoS managing module (cross-MNO pQoS API)
325*a* pQoS client MNO 1
325*b* pQoS client MNO 2
325*c* pQoS client MNO X
401 Receive a first QoS indication from a first MNO
402 Receive a first QoS indication from a second MNO
403 Translate the first QoS and the second QoS to a uniform format of the output QoS
404 Provide the translated first QoS and the translated second QoS to the receiver and/or to a backend

The invention claimed is:

1. A method for determining an effective quality of service (QoS) in mobile communication, comprising:

receiving a first QoS indication from a first mobile network operator (MNO), wherein the first QoS indication concerns a terminal and is defined according to a first QoS model;

receiving a second QoS indication from a second MNO, wherein the second QoS indication concerns the terminal and is defined according to a second QoS model different from the first QoS model;

translating the first QoS indication into a translated first QoS indication having a uniform QoS format and the second QoS indication into a translated second QoS indication having the uniform QoS format; and selecting, based on the translated first QoS indication and the translated second QoS indication, the first MNO or the second MNO to provide a service.

2. The method of claim 1, wherein the first QoS indication and the second QoS indication are predictive QoS (pQoS) indications.

3. The method of claim 1, wherein the uniform QoS format is terminal-dependent, or usage-scenario-dependent.

4. The method of claim 2, wherein a translation process used to translate the first QoS indication and the second QoS indication is learned by analyzing a correlation between a feature of the first pQoS indication and a feature of the second QoS indication.

5. The method of claim 2, wherein a translation process used to translate the first QoS indication and the second QoS indication is learned by executing one or more test sequences using the first MNO and the second MNO and analyzing a correlation between a feature of the first QoS indication and a feature of the second QoS indication.

6. The method of claim 5, wherein said correlation is based on: determining a first measured service value for the feature of the first QoS indication and a second measured service value for the feature of the second QoS indication; and correlating the feature of the first QoS indication and the feature of the second QoS indication according to a ratio between the first measured service value and the second measured service value, wherein the first measured service value and the second measured service value are of the same type.

7. The method of claim 2, wherein the translated first QoS indication and the translated second QoS indication are provided to the terminal.

8. The method of claim 2, wherein the translated first QoS indication and the translated second QoS indication are provided to a backend.

9. The method of claim 1, wherein each of the first QoS indication and the second QoS indication is qualitative or quantitative.

10. The method of claim 1, wherein the first MNO and the second MNO are configured to operate heterogeneous networks.

11. The method of claim 1, wherein each of the first QoS model and the second QoS model depends on a respective QoS determination process or one or more reported QoS indications.

12. The method of claim 1, further comprising switching, based on the translated first QoS indication and the translated second QoS indication, between the first MNO and the second MNO.

13. A method for determining an effective predictive quality of service (pQoS) in mobile communication, comprising:

receiving a first pQoS indication from a first mobile network operator (MNO), wherein the first pQoS indication concerns a terminal and is defined according to a first pQoS model;

receiving a second pQoS indication from a second MNO, wherein the second pQoS indication concerns the terminal and is defined according to a second pQoS model different from the first pQoS model;

translating, using a translation process, the first pQoS indication into a translated first pQoS indication having a uniform pQoS format and the second pQoS indication into a translated second pQoS indication having the uniform pQoS format;

receiving, from the terminal, feedback indicating, for each of the first MNO and the second MNO, a difference between the pQoS represented by the respective pQoS indication and an actual QoS experienced by the terminal;

adapting the translation process based on the feedback; and selecting, based on the translated first pQoS indication and the translated second pQoS indication, the first MNO or the second MNO to provide a service.

14. A non-transitory computer-readable medium storing instructions for determining an effective quality of service (QoS) in mobile communication that, when executed by a processing apparatus, cause the processing apparatus to:

receive a first QoS indication from a first mobile network operator (MNO), wherein the first QoS indication concerns a terminal and is defined according to a first QoS model;

receive a second QoS indication from a second MNO, wherein the second QoS indication concerns the terminal and is defined according to a second QoS model different from the first QoS model;

translate the first QoS indication into a translated first QoS indication having a uniform QoS format and the second QoS indication into a translated second QoS indication having the uniform QoS format; and select, based on the translated first QoS indication and the translated second QoS indication, the first MNO or the second MNO to provide a service.

15. The non-transitory computer-readable medium of claim 14, wherein the first QoS indication and the second QoS indication are a predictive QoS (pQoS) indications.

16. The non-transitory computer-readable medium of claim 14, wherein the uniform QoS format is terminal-dependent or usage-scenario-dependent.

17. The non-transitory computer-readable medium of claim 15, wherein a translation process used to translate the first QoS indication and the second QoS indication is learned based on feedback received from the terminal, the feedback indicating, for each of the first MNO and the second MNO, a delta between the QoS represented by the respective QoS indication and an actual QoS experienced by the terminal.

18. The non-transitory computer-readable medium of claim 15, wherein a translation process used to translate the first QoS indication and the second QoS indication is learned by analyzing a correlation between a feature of the first QoS indication and a feature of the second QoS indication.

19. The non-transitory computer-readable medium of claim 15, wherein a translation process used to translate the first QoS indication and the second QoS indication is learned by executing one or more test sequences using the first MNO and the second MNO and analyzing a correlation between a feature of the first QoS indication and a feature of the second QoS indication.

20. The non-transitory computer-readable medium of claim 19, wherein the correlation is based on determining a first measured service value for the feature of the first QoS indication and a second measured service value for the feature of the second QoS indication; and correlating the features according to a ratio between the first measured service value and the second measured service value.

* * * * *